United States Patent

Camion et al.

[11] Patent Number: 6,167,516
[45] Date of Patent: *Dec. 26, 2000

[54] DATA FILE AUTHENTICATION DEVICE

[75] Inventors: Paul Camion, Plaisir; Nicolas Sendrier, Le Chesnay; François Cordier, Bagneux; Pierre Kalfon, Paris, all of France

[73] Assignees: Inria Institut National de Recherche en Informatique et en Automatique Cogenit, Le Chesnay; Compagnie Generale d'Informatique et de Tele-Communications, Paris, both of France

[*] Notice: This patent issued on a continued prosecution application filed under 37 CFR 1.53(d), and is subject to the twenty year patent term provisions of 35 U.S.C. 154(a)(2).

[21] Appl. No.: 08/952,733
[22] PCT Filed: Apr. 10, 1997
[86] PCT No.: PCT/FR97/00640
 § 371 Date: Nov. 25, 1997
 § 102(e) Date: Nov. 25, 1997
[87] PCT Pub. No.: WO97/39408
 PCT Pub. Date: Oct. 23, 1997

[30] Foreign Application Priority Data

Apr. 12, 1996 [FR] France ................................. 96 04616

[51] Int. Cl.$^7$ ................................. H04L 9/00; H04K 1/00
[52] U.S. Cl. ........................... 713/168; 380/28; 713/165
[58] Field of Search ...................................... 713/200, 105, 713/168, 176, 179, 170; 380/250, 50, 4

[56] References Cited

U.S. PATENT DOCUMENTS

| | | | |
|---|---|---|---|
| 4,159,468 | 6/1979 | Barnes et al. | 340/146.1 |
| 4,319,079 | 3/1982 | Best | 380/4 |
| 5,351,301 | 9/1994 | Benincasa | 713/168 |
| 5,454,000 | 9/1995 | Dorfman | 714/54 |
| 5,584,023 | 12/1996 | Hsu | 395/620 |
| 5,655,021 | 8/1997 | Van Tilburg | 380/37 |
| 5,860,099 | 1/1999 | Milios et al. | 711/103 |

FOREIGN PATENT DOCUMENTS

| | | | |
|---|---|---|---|
| 0531194 | 3/1993 | European Pat. Off. | G06F 12/14 |
| 87/05726 | 9/1987 | WIPO | G96F 12/14 |

*Primary Examiner*—Gail O. Hayes
*Assistant Examiner*—Bryan Latham
*Attorney, Agent, or Firm*—Venable; George H. Spencer; Allen Wood

[57] ABSTRACT

A device receives at one input (2) data of a file to be processed, and includes a processing module (5) which at the start of receiving the file, react by three operative stages. These stages include first stage of inserting data blocks from the file into a source memory (MS), after transformation, a second continuous stage of processing each data block of the file, transformed and inserted into the source memory (MS), and a third stage of generating a signature from the transformed, inserted and processed blocks.

15 Claims, 7 Drawing Sheets

DATA FILE AUTHENTICATION DEVICE

BACKGROUND OF THE INVENTION

The invention concerns the field of certifying, or authenticating data files.

In certain fields, it is indispensable to certify documents to ensure that their contents cannot be contested. When the carrier of the document is paper, it is particularly easy to append a signature to each one of the pages of the said document, and to complete it, if necessary, by an appropriate marking as, for example, by punching.

However, this type of certification can be reproduced by an ill-intentioned person wishing to alter the contents of at least one part of the document concerned.

Moreover, the filing of documents certified on a paper carrier requires considerable filing space and renders their manipulation difficult.

Finally, the making of a certified copy conforming to an original certified document, or of an extract therefrom, requires many operations which increase the price and the time for obtaining it.

Thanks to recent developments in electronics, and more precisely in electronic information technology, it is henceforth possible to store the data of a document in a resident-type memory (a hard disk) or a removable memory (a 3½ inch-type disk or a 5¼ inch type disk).

However, while it is possible to store the data of a document in a memory-type carrier, it is, on the other hand, not possible to store a physical marking, as, for example, a punch mark or a stamp in relief. In other words, it is possible for an ill intentioned person to alter the stored data of a document, without it being possible for this to be noticed, and then to destroy the original.

To remedy this major drawback, the expert has developed complex algorithms, as for example Bosset's algorithm. These algorithms are set out in detail, particular in the following works:

B. Schneier, Applied Cryptography, 1996, John Wiley & Sons, and

J. Bosset, "Contre les risques d'altération, un système de certification des informations" (Against the risks of alterations, an information certifying system), 01 Informati-que, February 1977.

Bosset's algorithm operates on the non-commutative principle of matrix products, which makes it possible to effect a transformation of the data bits of a file stored in a source memory, which can only be inverted with difficulty.

Moreover, Knuth has developed a method aiming to improve the quality of a pseudorandom code generator. This method lies in inserting words into a source memory, and each time a bit is drawn from the memory in a random manner, it is replaced by its transform which is calculated by many operations. This method is set out in detail in the following works:

D. E. Knuth, "The art of computer programming", vol.2, p.32–33, 1981, Addison-Wesley, and Carter Bays and S. D. Durham, ACM Trans. Math. Software, chapter 1, pp.69–64, 1976.

Moreover, algorithms have been developed which are derived from a technique termed "rucksack" which lies in adding predetermined integers termed "increments", drawn in a pseudorandom manner from an increment memory, in the registers of a memory termed "rucksack".

These algorithms require, moreover, a source memory whose predetermined and fixed content serves to place during each processing of a file, a secret key intended to place the encryption function into a parametric mode. The data bits of the file are not processed continuously, but in blocks, which permits various possible combinations with the same final result. In spite of the complexity of the processing operations undertaken, it is always possible to decode the file and to gain access to the secret key. In these conditions, it becomes possible to modify the data and then to encode them again.

Besides, irrespective of the efficiency of a cryptographic algorithm, the latter only provides an encrypted transform of the original file, and not a signature of the latter.

SUMMARY OF THE INVENTION

One of the objects of the present invention is to propose devices which all makes it possible without exception to produce by continuous processing, one and only one signature (or an authentication sequence) for a given file, and not a cryptography for the latter.

Another object of the invention is to propose a simple authentication device, which ensures that any alteration, even of a single bit of a data file, leads to a signature (or an authentication sequence) that is completely different from the signature of the file before its alteration.

Yet another object of the invention is to ensure that with a specific authentication sequence given, it is humanly impossible to find a data file whose coding gives precisely the authentication sequence in question.

For this purpose, the invention proposes a device for authenticating a data file, of the type comprising an input for receiving the data of the file to be processed, a buffer memory for receiving temporarily the data of the file, a pseudorandom module provided with a working memory whose three segments are accessible, and processing means arranged for cooperating with the pseudorandom module so as to authenticate the file.

According to a main characteristic of the invention, the device comprises:

a memory termed a source memory, of the read-write memory type, and capable of storing words, each accompanied by an extraction status, a buffer memory arranged to dispose the data of the file in its free spaces, in the form of blocks, and processing means comprising:

a means for initializing the pseudorandom module, a transfer means, capable of placing into the second segment the transform by a first transformation of a word extracted from the source memory at an address drawn from the first segment, and finally placing into the location of the source memory thus freed, the transform by a second transformation of the third segment and of an operand which is either a data block stored in the buffer memory at a predetermined address, or, if there are no longer any, the word extracted from the source memory, whose extraction status is then modified, a cycle logic for activating the pseudorandom module, then causing this transfer means to operate until all the words of the source memory have been extracted once, and once only, and a generator of the authentication sequence, capable of activating the pseudorandom module, and extracting a random bit from one of the first and second segments at an address drawn from the third segment, repetitively until a chosen number of random bits is obtained, which form the authentication sequence of the file.

In this way, without it being necessary to have recourse to a ciphering or cryptographic algorithm which is very complex, a function is used whose computation of the reciprocal would take an astronomical time, or would require the use of very considerable computing means and is therefore dissuasive, and which provides a unique signature for a given file by continuous processing and in their order of arrival of the data which it contains.

The source memory henceforth serves to store the octets (or data bits) of the file to be processed, once read in the buffer memory. These octets thus stored are subsequently extracted from the source memory, one after the other in a random order.

Any modification of at least one bit of the file or any version of the octet inevitably leads to a signature totally different from the original signature.

This signature is obtained by applying three stages, a first stage of inserting data blocks of the file in the source memory MS, after transformation of the said blocks, a second stage of continuous processing of each block transformed and inserted into the source memory, and a third stage of generating a signature on the basis of the blocks that have been transformed, inserted and processed.

According to another characteristic of the invention, the processing means are arranged to order the initializing means to initialize the pseudorandom module and the source memory on receiving information of the start of the file to be processed, and the pseudorandom module is arranged to designate, after the said initialization, a zone from a plurality of zones, which comprises at least one of the first and second segments. Preferably, this zone is always the same. This may, for example, be the first.

Thus on receiving a signal of the beginning of the file, the generation of the certification of the file may start.

Advantageously, the pseudorandom module is arranged to increment by one unit, modulo the total number of zones of each first and/or second segment, or segments, the number of the current designated zone, after each extraction of a word from the source memory, then placing into this source memory a transform of a word or of a block having been subjected to a first and/or a second transformation (or transformations).

This makes it possible to cause the respective contents of the zones of the first and second segment to evolve little by little.

According to another characteristic of the invention, the device comprises a read only memory called an increment memory, forming a table for P predetermined integral increments.

These increments are extracted from the increment memory at addresses drawn in a pseudorandom manner from the contents of the segments, so as to obtain the first and second transformations.

Preferably, the transfer module is arranged to effect a fourth circular permutation-type operation, of at least one bit, over at least a part of the bits of the third segment of the working memory, after each first transformation, the result of this permutation constituting the new content of the said third segment.

The pseudorandom development of the third segment is thus reinforced.

It is also possible to reinforce the pseudorandom nature of the development of the first segment. To do this, the invention makes provision that after a chosen number of placements in source memory of transforms of words and/or blocks, the processing means effect a circular permutation, of at least one bit over at least a part of the bits of the first segment, the result of this permutation constituting the new content of the said first segment.

Similarly, it is preferable for the generator of the authentication sequence to be arranged so as to activate the pseudorandom module, then to cause the transfer means to operate at least partially, so that each bit is extracted from the segment concerned, after placement in the second segment of the transform by the first transformation of the word extracted from the source memory at the address drawn from the first segment.

In this way, the three stages have a substantially identical structure, with the exception of one step that characterizes them, which allows a simplification of the mode of embodiment of the device.

In a preferential mode of embodiment, firstly the buffer memory is of the shift register-type, wherein the data blocks are stacked, according to their order of arrival, beneath one another in the free space comprised between a first space and a last space, secondly, the transfer means is arranged for extracting the block which is situated in the first space, and thirdly, the buffer memory is arranged to produce after each extraction of the block stored in the first space, a shift by one position of the set of blocks situated after the first space, so that the block which was situated in the second space is stored in the first space.

BRIEF DESCRIPTION OF THE DRAWINGS

Other characteristics and advantages of the invention will become clearer on examining the detailed description given below, and the attached drawings, wherein.

DESCRIPTION OF THE PREFERRED EMBODIMENTS

The attached drawings are, in essence, of a definitive nature. They can therefore not only serve to complete the description, but also contribute to the definition of the invention, if required.

Figure 1:
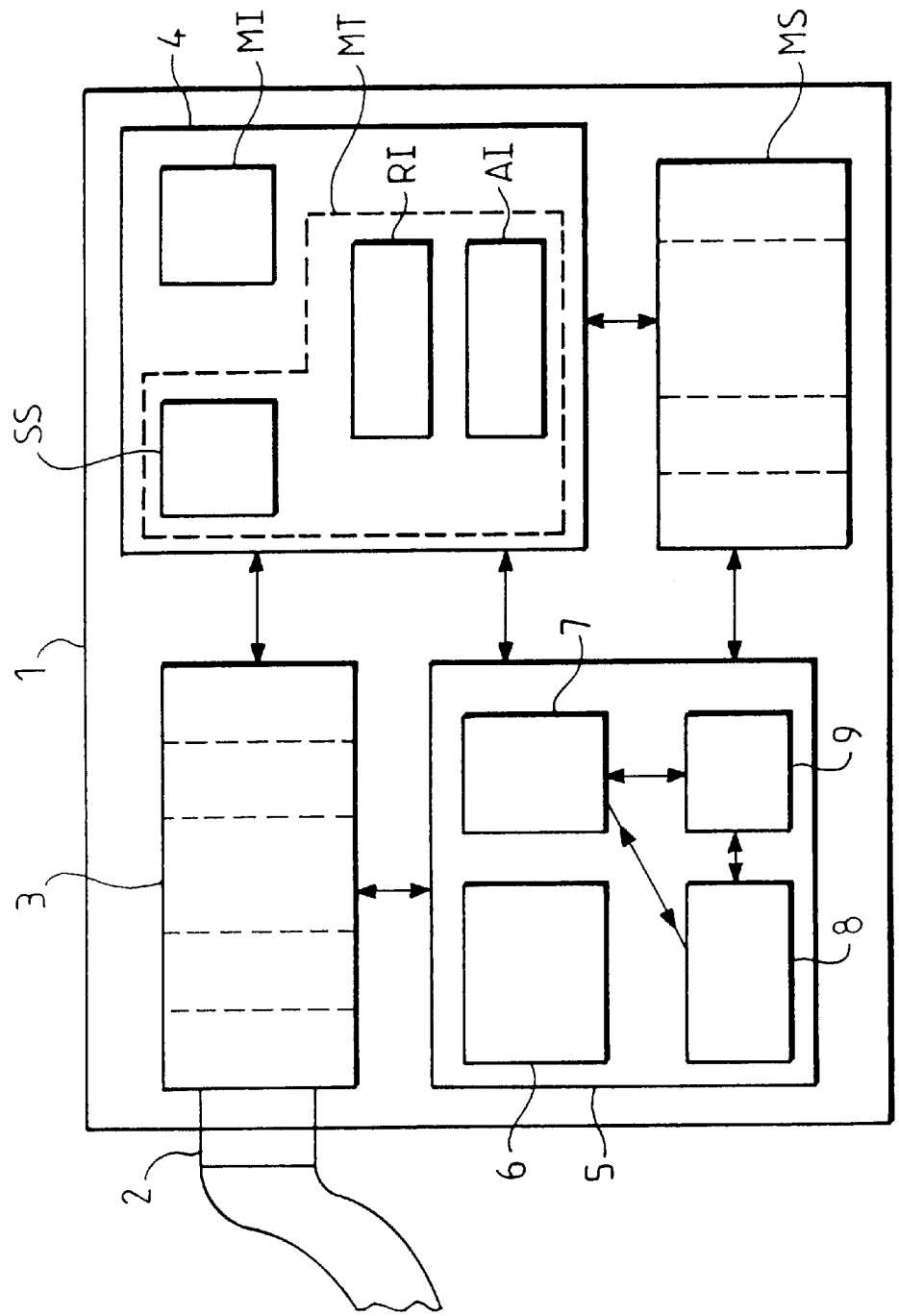
FIG. 1 is a diagram illustrating an authentication device in accordance with the invention.

Reference will first of all be made to FIG. 1 to describe an authentication device in accordance with the invention in a preferred, but not restrictive mode of embodiment.

In the following discussion, it will be assumed that the device is obtained in the form of an electronic component of a wholly integrated type, for example in silicone technology, which can be installed, in particular, in a microcomputer.

The device 1 in accordance with the invention has an input/output 2 capable of being connected to a computer (not shown), which is capable of sending a data file to it with a view to certifying the latter.

Of course, such an authentication device may comprise its own means for reading the data file.

The input/output 2 of the device 1 is connected to a buffer memory 3 capable of receiving the data of the file, in their order of arrival, then of storing them in the form of octets.

Preferably, this buffer memory is of the FIFO type. It thus makes it possible to generate a waiting queue between synchronous processes, the one being a process termed a "producer" process which provides data of a file to be treated, the other being a process termed a "consumer" process which processes the data stored in the waiting queue. As the data of the file arrive, they are cut into blocks of 15 bits, for example 8 bits (an octet), accompanied by an end of file status bit which is in a first state, for example "1", when the block is the last of the file, and in a second state, for example "0", in the opposite case. In the course of a first loop, the consumer process extracts the block which is situated at the top of the FIFO and which therefore comprises the first data of the file. Subsequently, the block which was situated in the second position advances by one notch, to assume the first position with a view to its extraction during the following loop. Each block is thus shifted by one notch during each extraction.

Moreover, with the object of allowing the two processes to function at different rates of speed, the FIFO comprises a bit regarding its filling status, which is decorrelated from the end of file status bit. This filling status bit (or synchronization signal) can be read by the producer process which can slow down its rate of sending the data of the file when the FIFO is full, (the case when the consumer process is slower than the producer process), or accelerate its rate of sending the file data when the FIFO is not full (the case when the consumer process is faster than the producer process).

The buffer memory 3 is connected to a pseudorandom module 4 intended to effect a pseudorandom-type processing of the contents of a working memory MT which can be divided into at least three segments, which are not necessarily contiguous, by using an increment memory MI, wherein a table of, for example 256 integral increments is stored. In the example illustrated, this working memory MT has a first register SS, a second register RI and an increment accumulator AI intended to obtain partial sums relating in particular to the increments of the increment memory MI.

The pseudorandom module 4 is connected to a processing module 5 capable of commanding it, as well as to a source memory MS of the read-write memory-type intended to store the octets of the file after transformation of the latter by means of the pseudorandom module 4.

The processing module 5 comprises a module 6 for initializing the pseudorandom module 4 and the source memory MS, and a transfer module 7 intended in particular to extract data blocks from FIFO 3 to insert them after processing, first of all in the source memory MS, then in the second register RI. It comprises, moreover, a cycle logic 8 to actuate repetitively, the pseudorandom module 4, as well as a generator 9 of the authentication sequence arranged, in particular, to actuate the pseudorandom module 4, so as to produce a random bit sequence forming the unique signature of the file to be processed.

The general operation of such a device is given below.

When the first data of a file arrive at the level of the input/output 2, the processing module 5 starts the initialization of the pseudorandom module 4 by means of its initialization module 6, then it starts three stages:

- a first stage termed an "implantation" stage during which the data of a file are stored in the form of blocks in the FIFO 3 in their order of arrival, and at the same time, the transfer module 7 extracts the blocks from the FIFO3, one after the other and always in their order of arrival, so as to insert them in a first stage in the source memory MS after a transformation (termed for convenience, second transformation), and start their pseudorandom extraction with a view to their insertion in the second register RI, after another transformation (termed for convenience, first transformation). This stage 1 lasts as long as there remain data blocks in the FIFO3 to be inserted in the source memory MS, that is to say, as long as the transfer module 7 does not detect an end of file status at "1" accompanying a data block stored in the FIFO3;

- a second stage termed "exhaustive run", wherein the transform module 7 extracts once and once only in a pseudorandom manner, each one of the data blocks inserted in the source memory MS (henceforth called words) and which has only been subjected to the second transformation, to insert them in the second register RI, after having subjected them to the first transformation;

- a third stage termed "elaboration of the authentication sequence" wherein the 160 random bits constituting the authentication sequence are elaborated, which form the signature of the file to be processed. Of course, the number of random bits forming the sequence may be smaller or greater than 160. The authentication sequence is passed by the processing module 5 to the input/output 2 which subsequently passes it to the element concerned, for example the microcomputer, with a view to a merger of the data of the file and the authentication sequence.

Of course, in a wholly integrated device, the merger of the file and its signature may be performed by the processing means which may comprise for this purpose an additional memory intended to store the whole set of data of the file, when these have been extracted from the FIFO3, to be inserted in the source memory MS during the stage 1.

Figure 2:
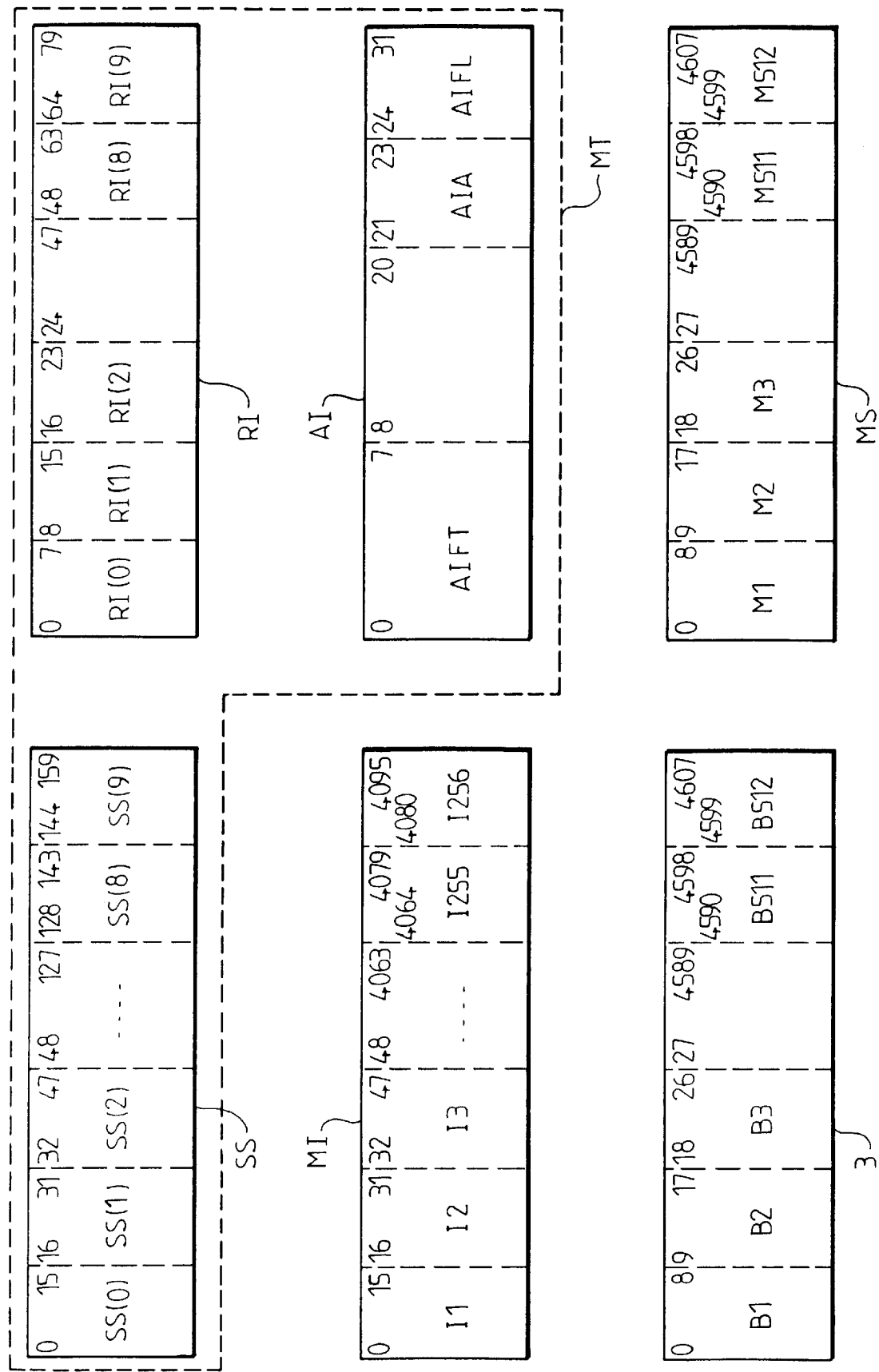
FIG. 2 schematically outlines the organization of the memories and registers of the device in accordance with the invention, in a particular mode of embodiment.

Reference will now be made to FIG. 2, to describe a non-restrictive mode of embodiment of the memories and registers of the device according to the invention in greater detail.

The buffer or FIFO memory 3 of the read-write type is, for example, capable of receiving 512 blocks of data bits, of for example 9 bits (8 data bits of the file and the end of file status bit). The first block is stored in a first space (or field) B1, the second block is stored in a second space B2, etc. and the block 512 is stored in a last (512th) space B512.

Of course, it may be envisaged for the FIFO3 to store the data in the form of blocks of a size other than 9 bits, for example 18 bits (two data octets plus two status bits).

The increment memory MI comprises, for example 256 integral increments I1 to I256, each increment occupying 16 bits. This increment memory is of the read only memory (ROM) type and forms a table of 4096 bits in this example. Each increment of the table MI may be designated by a value of 8 bits.

In the example described, the working memory MT comprises three independent segments: two registers SS and RI, and an increment accumulator AI.

The increment accumulator AI (or third segment) is an accumulation memory of, for example, 32 bits. It makes it possible to effect operations modulo $2^{32}$.

AI may be divided into four parts, whereof a first part AIFT comprises the bits 0 to 7, a second part AIFL comprising the bits 24 to 31 and a third part AIA comprising the bits 21 to 23.

By convention, as regards each memory, it is considered that the bit whose number is the lowest one, for example 0, is the bit with the highest weighting, while the bit whose number is the highest, for example 31, is the bit with the lowest weighting.

Consequently, in this example of the embodiment, the first part AIFT comprises the bits with a hight weighting, while the second part AIFL comprises the bits with a low weighting.

The first register SS is a read-write memory subdivided into 10 zones i (i=0 to 9), each zone being capable of storing 16 bits and being addressed respectively by a number of 8 bits.

The second register RI is a read-write memory also subdivided into ten zones i (i=0 to 9) of 8 bits each and being capable of being addressed respectively by a number of 8 bits.

Of course, the first and second registers SS and RI can constitute only a single register subdivided into two parts, each part comprising ten zones.

The source memory MS is a memory of the read-write type capable, for example, of storing 512 blocks M1 to M512 of 9 bits each and being capable of being addressed by a number of 9 bits. Of these 9 bits, eight are data bits, while the ninth bit is a status bit making it possible to know whether the word with which it is associated, has already been extracted from the source memory or not.

It is obvious that the source memory MS may be integrated in the pseudorandom module 4.

Reference will now be made to FIGS. 3 to 6, to describe a mode of operation of the device in accordance with the invention, in the mode of embodiment illustrated in FIGS. 1 and 2.

In the following discussion, we will use indices whose definitions are as follows:

index i (i=0 to 9) designating one of the ten zones of the first register SS and second register RI of the pseudorandom module 4;

index l (l=0 to T−1) indicates the position of an octet of the file relative to its order of arrival at the level of the input 2, the octet No. 0 being the first arrival, while the octet No.T−1 is the last arrival;

index k (k=0 to N−1) indicates the number of the random bit of the authentication sequence, whose number of total bits is N, for example N=160 bits; and the index j (j=0 to 511) serves to count during the second stage, the number of fields used once and once only in the source memory MS.

Irrespective of its mode of embodiment, the device in accordance with the invention comprises the three stages set out above, which comprise preferably operations that are substantially identical by their structure and their chaining, with the exception of at least one of them which characterizes the stage concerned.

Figure 3A:
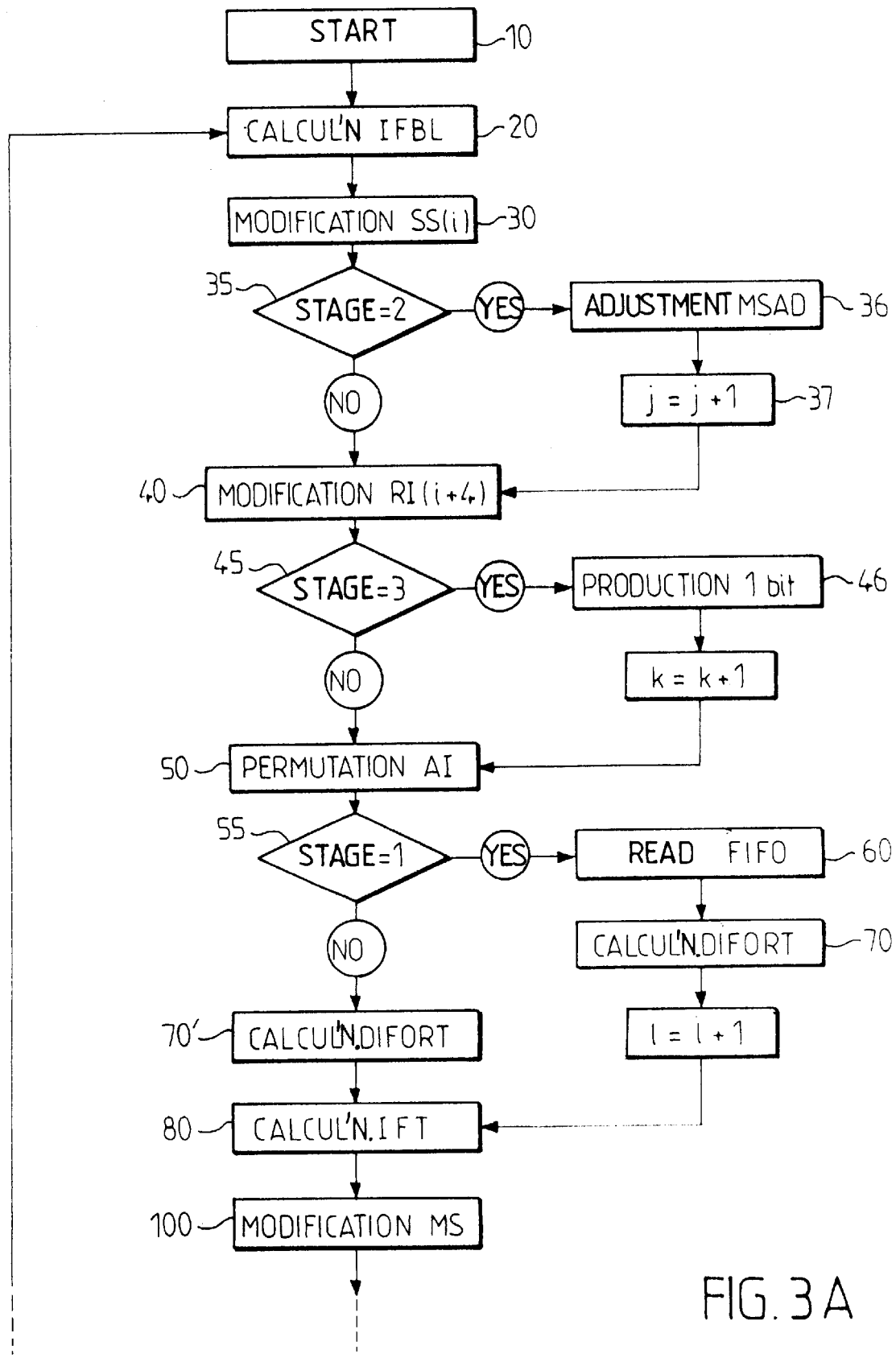
FIGS. 3A and 3B illustrate a general algorithm which combines the set of the three stages performed by the device illustrated in FIGS. 1 and 2, the separation into two Figures having been effected for reasons of space.
Figure 3B:
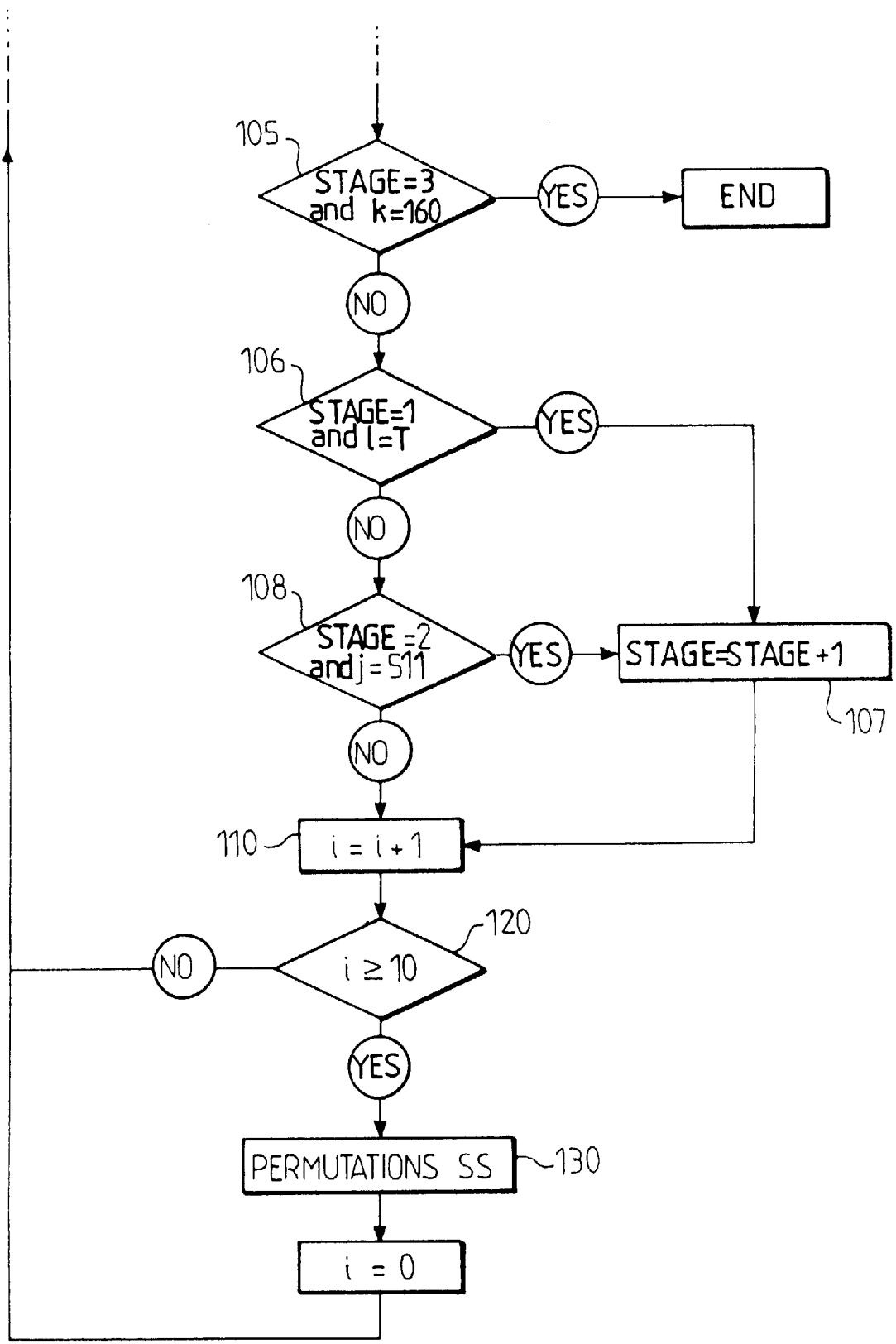

The three stages and their main operations are combined in a general algorithm illustrated in FIGS. 3A and 3B. The main operations forming part of each stage are illustrated respectively in FIGS. 4 to 6.

Figure 4:
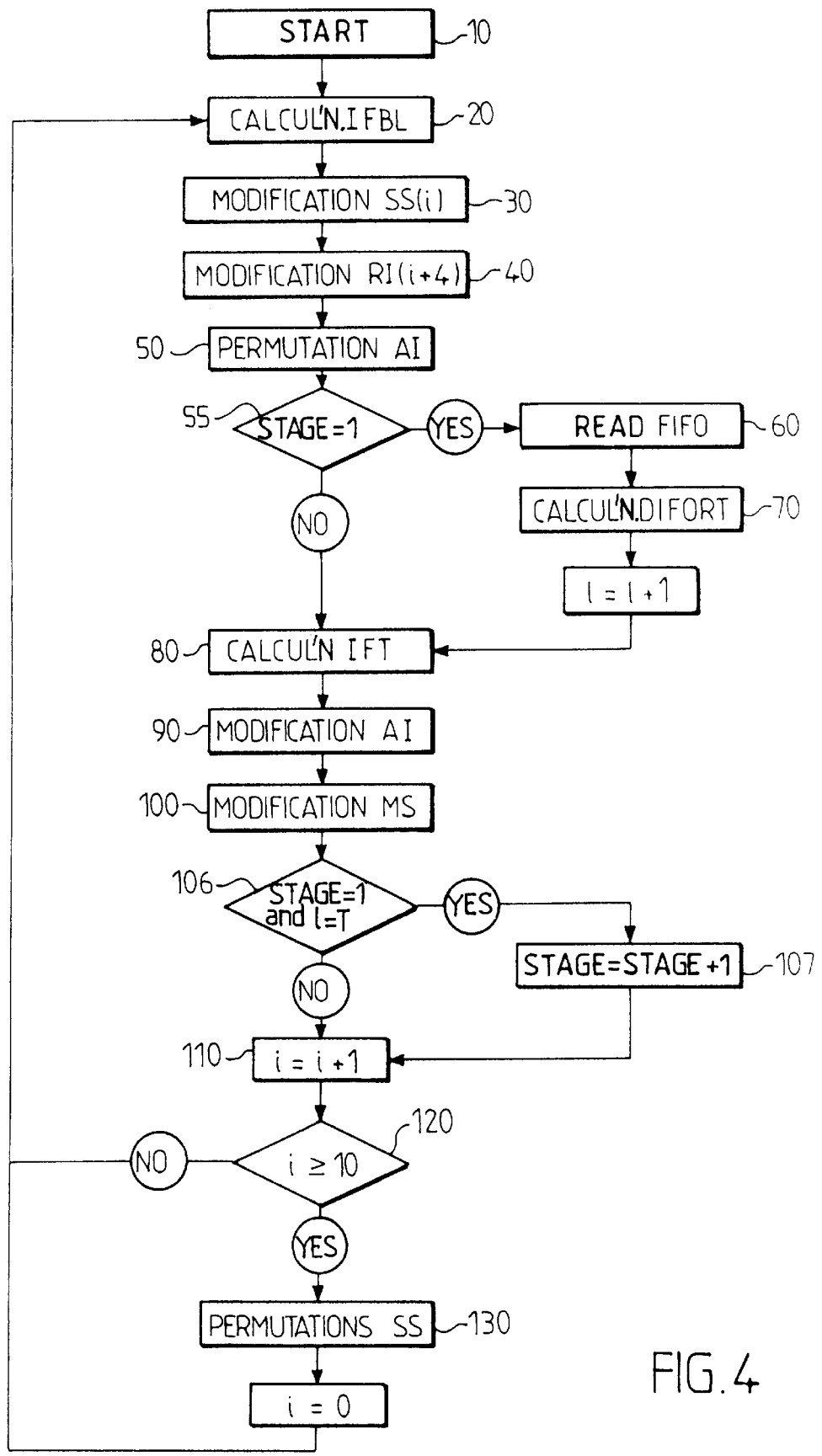
FIG. 4 illustrates only stage 1 of the general algorithm of FIGS. 3A and 3B.

Reference will first be made to FIGS. 3A, 3B and 4 to describe stage 1.

This stage starts when the processing module detects the first data of a file to be processed, which has arrived at the input/output 2. This starts, on the one hand, the initialization of the pseudorandom module 4 (step 10 designated "start"), which is effected by the initialization module 6, and on the other hand, the storing of the data of the file in the FIFO3, in the form of blocks B1 comprising an octet accompanied by an end of file status bit.

If the transmission of the file data is faster than the processing of the blocks, the latter are stacked beneath one another in the FIFO3 which, when it is filled with 512 blocks, alerts the transmitter by positioning its synchronisation bit to the value of "1" for example. This is then understood by the transmitter as a request for the provisional stopping of the transmission.

The first block is stored in a first field (bits 0 to 8), the second block which has arrived is stored in a second field (bits 9 to 17) etc.

The initialization lies in setting to zero, the indices i, j, k and l and the contents of the first register SS and second register RI of the source memory MS, including the extraction status bits associated with each of the words capable of being stored in this memory, as well as the increment accumulator AI.

Of course, the initialization stage may comprise, after the setting to zero of the contents of the memories and registers AI, SS, RI and MS, an insertion of a chosen increment (or increments) in these memories and/or registers.

The insertion of the octets of the file in the source memory MS starts with the activation of the pseudorandom module 4 by the processing module 5, which designates the zones i=0 of the first register SS and second register RI, or respectively their bits 0 to 15 and 0 to 7. Of course, one could decide, at the start of stage 1, to designate any other zone i.

In cooperation with the transfer module 7, the pseudorandom module subsequently calculates the respective contents of the first register SS and second register RI, and of the increment accumulator AI. This is effected as follows.

The 8 bits contained in the zone i=0 of the second register RI are extracted. The content of this zone RI(0) is combined, for example by a logic operation of the EXCLUSIVE OR type, with the bits 24 to 31 of the increment accumulator AI, which provides a result of 8 bits designated DIFBL. This value DIFBL designates an increment of the increment memory MI, which is called IFBL. The calculation of the IFBL constitutes step 20.

This increment IFBL of 16 bits is subsequently added, modulo 65536, to the 16 bits of the zone i=0 of the first register SS. This constitutes the step 30.

A test 35 is then effected to determine whether the number of the stage is equal to 2. If this is not the case, one passes to step 40, wherein one uses the new content of the zone i=0 of the first register SS, to designate an address of the source memory MS from which one extracts the information octet from the 9 bits which it contains, the ninth bit concerning the extraction status of this word, which is ignored during the whole stage 1. This content designated MS8W is combined, for example by a logic operation of the EXCLUSIVE OR type with the 8 bits of a low weighting (bits 8 to 15) of the zone i+1=1 of the first register SS.

The result of this combination is subsequently combined, for example by another logic operation of the EXCLUSIVE OR type with the content of the zone i+4=4 of the second register RI, and the result of this new combination replaces the preceding content of this zone i+4=4 of the first register RI.

The processing effected on the octet (or word) extracted from the MS with a view to its insertion in RI(i+4) is called the first transformation.

Of course, many other operations may be effected on the other zones of the first register SS and second register RI to cause their respective contents to evolve.

Subsequently, a new test 45 is effected regarding the number of the current stage. If this is different from 2, then one preferably effects a circular permutation (step 50) of at least one position towards the right of the bits of the increment accumulator AI.

One then proceeds with a new test 55 regarding the number of the current stage. If this is equal to 1, the transfer module 7 then extracts the block which is stored in the first field of the FIFO3 in a step 60. The block which was situated in the second position in the FIFO3 then passes into the first position which, in fact, shifts all the other stored blocks by one unit.

The octet of the extracted block will then be subjected to a processing termed a second transformation, which lies in combining it by a logic operation, for example of the EXCLUSIVE OR type, with the eight first bits with a high weighting of the increment accumulator AI, contained in the part AIFT (bits 0 to 7). The result of this combination, which represents the transform of the octet of the block extracted from the FIFO3, is designated DIFORT. This constitutes step 70.

There then follows a step 80, wherein the transfer module 7 uses DIFORT to designate an increment of the increment memory MI which is designated IFT. Then, in step 90, the module 7 effects, for example the chaining of the increments IFT (high weighting) and IFBL (low weighting calculated during the step 20). The result of this chaining is added modulo, $2^{32}$, at the increment accumulator AI, which constitutes the new content of the latter.

DIFORT, calculated in step 70 is then inserted into the source memory MS at the address where the octet, or word, extracted in step 40 is situated, which is given by the content of the bits with a low weighting 7 to 15 of the zone i=0 of the first register SS. This constitutes the step 100.

Thus, because of the extraction of an octet (or word) from MS in step 40, there always exists at least one empty space in this source memory MS, which makes it possible to insert therein an octet extracted from the FIFO3.

Subsequently, several tests 105, 106 and 108 relating to the number of the current stage are effected. Then in a step 110, the pseudorandom module 4 increments the number i of the zone concerned of the first and second registers by one unit. In this example, the designated zones henceforth bear the numeral 1.

Preferably, after this incrementation in step 110, a new test 120 is effected regarding the number of zones i concerned, as from the start of stage 1. If this number is less than the number 10 for example, one returns to the step 20. On the other hand, if this number is equal to 10, the pseudorandom module 4 effects in a step 130, a circular permutation of at least one position, towards the right or towards the left, of the bits of all the zones of the first register SS. Then, after having reset the index i designating the zones of SS and RI to the value i=0, one returns to step 20 in order to extract a new octet from the FIFO3.

To do this, the whole of the steps 20 to 100, then 105, 106, 108, 110 are repeated and if required, the steps 120 and 130 by using the current index i.

As long as there remains an octet FIFO3 to be extracted, the above steps are repeated.

After extraction in FIFO3 of the last octet (l=T−1) of the file, and once having arrived at step 106, one proceeds to the 107 to the incrementation of the number of the stage by one unit. Then the steps 110 and if required 120 and 130, are again undertaken, which leads back to the step 20. The stage 2 can then start with the current index i. All the octets of the file have then been inserted into the source memory MS, and some of them have already been possibly inserted into the second register RI (after having received the first and second transformations) if the address at which they have been inserted in the MS has been drawn from the first register SS (zone i) during successive steps 30.

Figure 5:
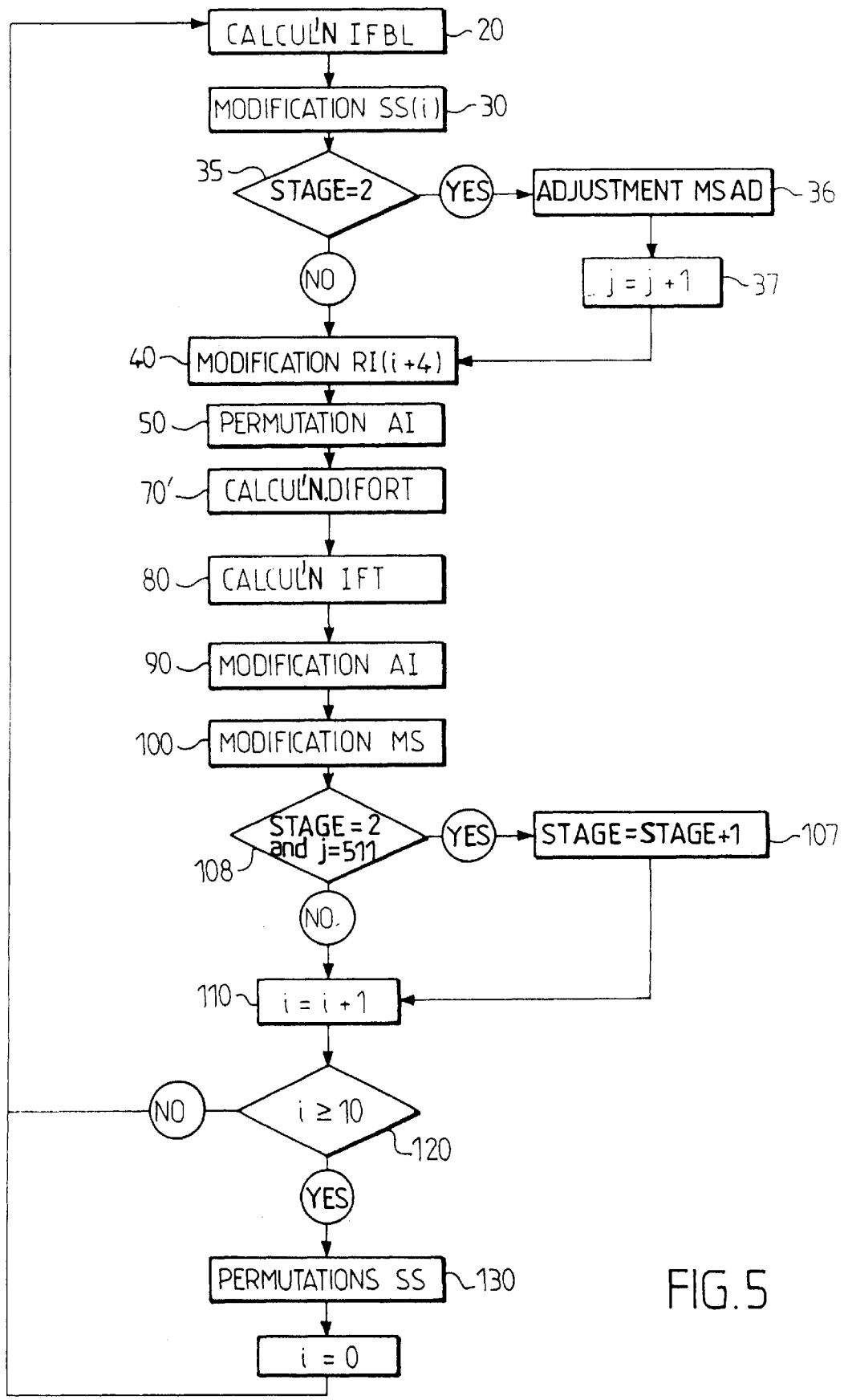
FIG. 5 illustrates only stage 2 of the general algorithm of FIGS. 3A and 3B.

Reference is now made to FIGS. 3A, 3B and 5 to describe this stage 2 of the exhaustive run.

The cycle logic 8 activates the pseudorandom module 4 and causes the transfer module 7 to operate so as to effect the steps 20 and 30. This makes it possible to obtain IFBL and to cause the content of the first register SS to evolve, and in particular that of its zone i concerned.

Subsequently the test 35 is effected, which indicates that the number of the stage is equal to 2. One then passes to a step 36, wherein the extraction of the octet forming the word M is proceeded with, which has until now only been subjected to a second transformation during the stage 1, and which is contained in the source memory MS at the address designated by the content of the bits with a low weighting of the zone i concerned of the first register SS, which content was modified during the step 30.

The octet (or word) M is extracted together with the associated extraction status bit, whose value makes it possible to indicate to the pseudorandom module 4 whether the said octet M has already been extracted.

If this bit is in a "high" state, for example if the value equals "1", then this means that the transformed octet M has already been extracted and that it is necessary to proceed to another transformed octet that has not been processed. On the other hand, if this bit is in a "low" state, for example, if its value equals "0", this means that the octet (or word) has not yet been extracted from the source memory MS, and that therefore it can be subjected to the first transformation, with a view to inserting it in the second register RI (the current zone concerned i+4), which is accompanied by a modification of the status of the extraction status bit, the detail whereof is given below.

Each one of the 512 extraction status bits of each of the 512 word stored in the source memory MS forms a table of 512 bits subdivided into 32 words of 16 bits, for example. As indicated above, each bit of value 1 is associated with a word M already extracted during a preceding loop of the second stage.

The 9 bits of the address of the zone i concerned of the first register SS are now divided into 5 bits with a high weighting designated MSFORT and 4 bits with a low weighting designated MSFBL. A second table TFORT of 32 bits is then associated with the 5 bits with a high weighting MSFORT. Each bit of this table TFORT is associated with a possible value of MSFORT, as well as with a word of 16 bits of the table TB of 32 words.

When a bit of the table TFORT equals 1, then all the bits of the word of 16 bits of the table TB are at 1.

At the start of the second stage, all the bits of the table TB and of the table TFORT are therefore at zero. We will now return to the octet or word M extracted during the step 36. Two cases occur:

if the bit associated with the word M equals 1, then the value of MSFORT is incremented by one unit as often as one meets a bit of TBFORT whose value equals 1. When one arrives at a bit of TBFORT whose value equals 0, one can then examine the word of 16 bits associated with the said bit whose value equals 0 in the table TB;

if the bit equals 0, the associated word of 16 bits in the table TB is then examined.

The value of MSFBL then provides the address of a bit of the word in the course of being examined of the table TB. If the value of this bit equals 0, then the octet or word M to be extracted from the source memory MS is situated at the address given by the current content of the chaining of TBFORT and MSFBL.

On the other hand, if the value of this bit equals 1, the content of MSFBL is then incremented by one unit, as long as the bit of the examined word equals 1. When this value of the examined word equals 0, then the transformed word M of the source memory MS is extracted at the current address given by the chaining of TBFORT and MSFBL.

The bit selected by the content of MSFBL in the word of the table TB selected by the content of TBFORT is then set to 1. If the word of the table TB contains only bits whose value equals 1, the bit of the table TBFORT selected by the content of TBFORT is also set to value 1. When the bits of the table TBFORT all become equal to 1 by the preceding operation, one then passes to the third stage.

We will now return to the process flow of stage 2. After modification of the status of the extraction status bit of the word M extracted in step 36, the value of the index j is incremented by one unit, which index indicates the number of fields used only once in the source memory MS from the start of stage 2 (which number has been equal to 0 until now), then the steps set out during stage 1 are resumed.

At first, in step 40, the word extracted from MS is inserted in the current zone i+4 concerned of the second register RI. Steps 45 and 50 are then undertaken, then the test 55, whose result indicates that the number of the stage is different from 1. In a step 70', substantially identical with the step 70 of stage 1, one then proceeds with the calculation of DIFORT which is the result of the combination by an EXCLUSIVE OR of the transformed octet of MS extracted in step 36 and of the content of the bit with a high weighting 0 to 7 of the increment accumulator AI.

Steps 80 and 90 are subsequently undertaken; then in step 100, DIFORT is placed into the source memory MS at the address of the transformed octet extracted during step 36. Henceforth this octet reinserted into the SM has an extraction status bit whose value prohibits a new extraction.

Then all the steps set out in stage 1 are repeated until returning to step 20 in order to proceed to a new extraction of a word from MS that has not yet been extracted.

All the steps described above are then repeated, as long as one of the extraction status bits of MS is in a low state, indicating that the associated word has not been extracted from the MS. Consequently, this stage 2 is repeated as long as there remains a field of the source memory MS that has not been used, which is the case as long a j differs from the value of 511.

When all the extraction status bits are in their high state (=1), the test 108 indicates that the index j equals 511. In step 107 the incrementation of the number of the stage is then undertaken; then one returns to step 20, after having carried out the steps 110 and 120 and 130 if required. The final stage (No. 3) can then commence.

Figure 6:
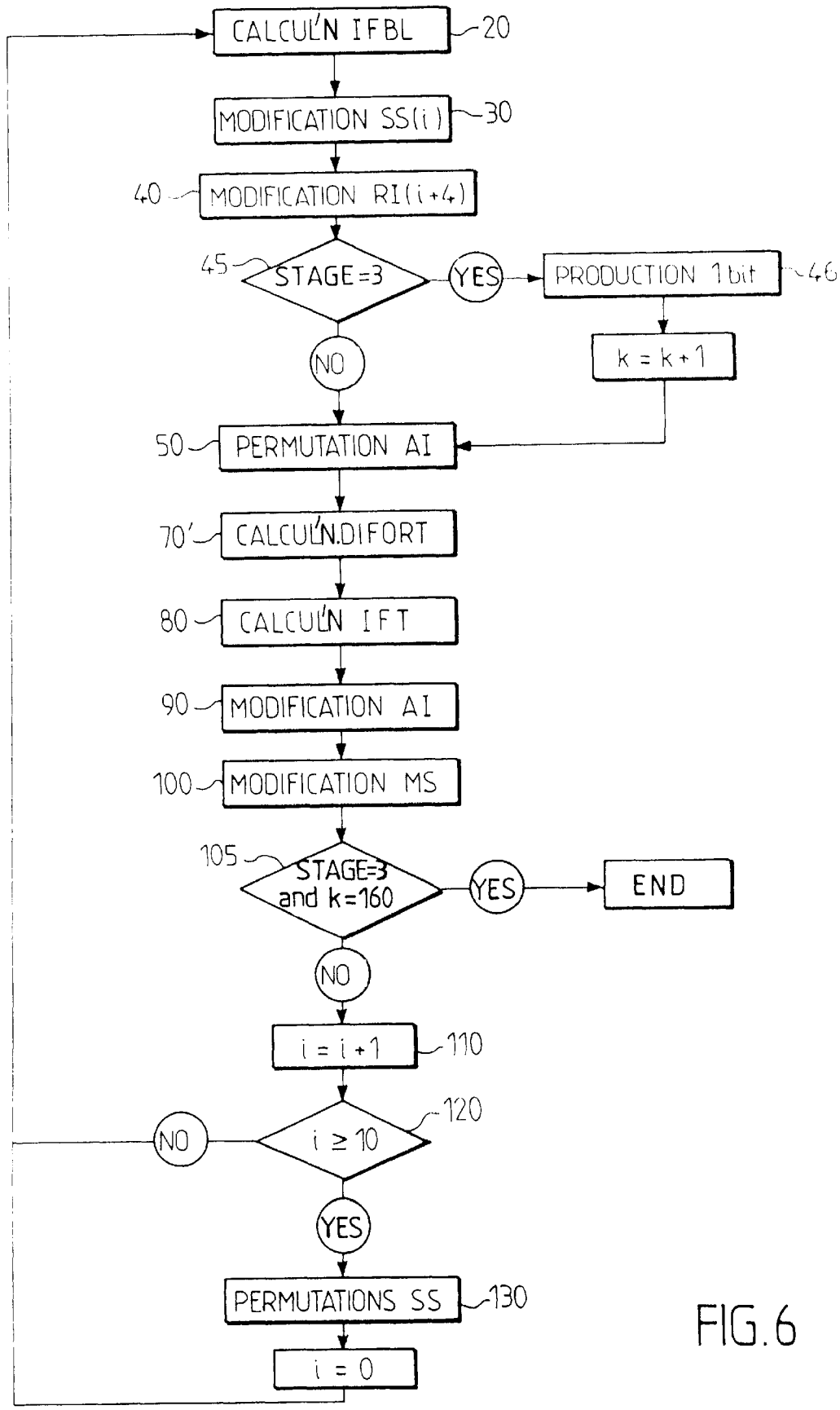
FIG. 6 illustrates only stage 3 of the general algorithm of FIGS. 3A and 3B.

Reference will now be made to FIGS. 3A, 3B and 6, to describe this stage 2 for elaborating the signature of the file in the course of being processed. The generator 9 of the authentication sequence activates the pseudorandom module 4 and preferably causes the transfer module 7 to operate, so as to carry out the steps 20, 30 and 40. This makes it possible to obtain IFBL, to cause the content of the first register SS to evolve, and in particular that of its current zone i concerned, to extract a word from MS and to insert it in the current zone i+4 concerned of the second register RI.

Then, when test 45 indicates that the number of the stage is equal to 3, one proceeds in a step 45 with the elaboration of a random bit of the authentication sequence.

To do this, a bit is extracted from the zone i+4 (i being the value of the current zone concerned) of the second register RI whose content has been modified during step 40. This bit is designated by the content of the third part AIA (the bits 21 to 23) of the increment accumulator AI. The index k is then incremented by one unit, which passes from the value of 0 to the value of 1.

The steps 50, 55, and 70' to 110 and, if required 120 and 130, are then undertaken, just as in stage 2. One then returns to step 20 in order to proceed with the elaboration of the following random bit. This steps are repeated by the generator 9 as long as the test effected in step 105 after step 100 indicates that the value of the index k is less than the total number of the random bits of the authentication sequence (which equals 160 in this example).

When k=160, the signature of the file is ready. The processing is terminated by undertaking the steps 106 to 110, and 120 and 130 if required, or as a variant, the processing module 5 directly passes the authentication sequence forming the signature of the file to the input/output 2 which communicates it to the microcomputer that had requested it.

Of course, the operation of a device in accordance with the invention may comprise very many variants at the level of the operations and calculations effected on the set of bits contained in the various memories.

It is obvious that in such a device, the number of octets contained in the file to be processed may be very much higher than the number of octets capable of being stored in the source memory, as well as in the buffer memory, which memories do not necessarily have identical storage capacities. As has been set out above, this is due to the fact that in stage 1 during each processing loop one octet (but this may be any number of bits) is extracted from the source memory and replaced by an octet extracted from the buffer memory.

This has the result that there always exists at least one available place in the source memory to receive the data of the file to be processed. This characteristic thus makes it possible to treat advantageously any size of file continuously, independently of the processing capacities of the device.

It is, moreover, obvious that the capacities of the various memories and registers are not limited to the capacities used above by way of example.

Thus the number of the blocks of bits which the buffer and source memories may respectively contain may be much higher or lower than 512. The same applies to the respective sizes of their blocks.

Similarly, the number of bits of each zone of the first and second registers may vary considerably from the number described in the example, just as the number of increments and the number of bits which compose each one of them may differ considerably from those described. The same applies to the number of bits of the increment accumulator which be higher than or lower than 32 according to the requirements, as well as the number of random bits forming the authentication sequence, which is not limited to 160.

Moreover, it is obvious that the processing effected in each loop in the steps 120 and 130 is not obligatory, just like that (a circular permutation) effected in step 50.

Finally, more complicated transformations relating to the insertion of words of the file into the source memory may also be envisaged.

Thus a source memory may be envisaged that is divided into two parts, wherein in each loop of one stage a block of bits (which may be of any number) extracted from the buffer memory would be inserted in one of the two memories and would then be subjected to one or several transformations so as to be inserted in the second part of the source memory. These two parts of the source memory would thus fill up little by little with transformed octets which would each be used only once, to serve subsequently for the elaboration of the authentication sequence forming the signature.

What is claimed is:

1. A device for authenticating a data file, comprising:
an input (2) capable of receiving the data of a file to be processed;
a buffer memory (3) arranged to store said data in the form of blocks, at predetermined addresses;
a pseudorandom module (4) provided with a working memory (MT) having at least a first segment (SS), a second segment (RI), and a third segment (AI);
a source memory (MS) of the read-write memory type, capable of storing words, each accompanied by an extraction status; and
processing means (5) arranged to cooperate with the pseudorandom module (4) and the source memory (MS) so as to authenticate the file, said processing means being arranged for performing:
a first transfrinnation on a word extracted from the source memory (MS) at an address drawn from the first segment (SS(i)), and
a second transformation on the third segment (AI), with an operand which is either one of said data blocks or, if there are no longer any, the extracted word from the source memory (MS), the extraction statis of said extracted word being then modified,
wherein the processing means includes:
an initializing module (6) to initialize the pseudorandom module,
transfer means (7) capable of placing into the second segment (RI(i+4)), the transform by said first transformation of the extracted word, and finally replacing the extracted word in the source memory, by the transform by said second transformation of the third segment (AI),
a cyclic logic (8) for actuating the pseudorandom module (4), and causing the transfer means (7) to operate until all the words of the source memory (MS) have been extracted once, and once only, and
a generator (9) of the authentication sequence, capable of actuating the pseudorandom module (4), and extracting a random bit from one of the first segment (SS) and second segment (RI) at an address drawn from the third segment (AI), repetitively until a predetermined number of random bits is obtained, and
wherein said predetermined number of random bits forms an authentication sequence for authenticating the data file.

2. A device according to claim 1, wherein the pseudorandom module (4) further comprises an increment memory (MI), forming a table for P predetermined integral increments, the increment memory being a read-only memory.

3. A device according to claim 2, wherein the pseudorandom module (4) is arranged to extract before the first transformation, an increment of the increment memory (MI), at an address drawn from the result of a first operation between at least one predetermined part of the third segment (AI) and at least one predetermined part of the content of one of the first segment (SS) and second segment (RI), and to effect a second operation between at least one predetermined part of the current content of the first segment (SS) and at least the result of the first operation, the result of this second operation replacing the current content of the first segment (SS).

4. A device according to claim 3, wherein the pseudorandom module (4) is arranged to effect a third operation between the word extracted from the source memory, and the respective current contents of at least one part of a zone (i+1) of the first segment (SS) and of at least one part of a zone (i+4) of the second segment (RI), the result of this third operation forming the transform by the first transformation, of the word extracted from the source memory and constituting the new content of the zone (i+4) of the second segment (RI).

5. A device according to claim 3, wherein the transfer means (7) is arranged to extract, after each second transformation, an increment from the increment memory (MI, either of the transform of the word extracted from the source memory, or of the transform of the block extracted from the buffer memory (3), according to the origin of the block or word having been subjected to the said second transformation, and to effect a further operation between the said increment thus extracted from the increment memory (MI) and the current content of the third segment (AI), the result of this further operation constituting the new content of the third segment (AI).

6. A device according to claim 5, wherein the transfer means (7) is arranged to take also into account during the further operation the increment extracted from the increment memory (MI) at the address drawn from the result of the first operation.

7. A device according to claim 1, wherein the processing means (5) is arranged to order the initialization module (6) to initialize the pseudorandom module (4) and the source memory (MS) on receiving information of the start of the file to be processed, and wherein the pseudorandom module (4) is arranged to designate, after the said initialization, a zone (i) from a plurality of zones which comprises at least one of the first segment (SS) and second segment (RI).

8. A device according to claim 7, wherein the pseudorandom module (4) is arranged for incrementing by one unit, modulo the total number of zones of each first segment (SS) and second segment (RI), the number (i) of a currently designated zone, after each extraction of a word from the source memory (MS), and then placing into the source memory a transform of a word or of a block that has been subjected to at least one of the first and second transformations.

9. A device according to claim 7, wherein the generator (9) of the authentication sequence, after activating the pseudorandom module (4), is arranged to then cause the transfer means (7) to operate at least partially, so that each bit is extracted from the segment (RI) concerned, after placement in the second segment (RI(i+4)) of the transform by the first transformation of the word extracted from the source memory (MS) at tie address drawn from the first segment (SS(i)).

10. A device according to claim 7, wherein the generator (9) of the authentication sequence extracts each bit from a current zone (i) of the second segment (RI).

11. A device according to claim 7, wherein the pseudorandom module (4) is arranged for incrementing by one unit, module the total number of zones of each first segment (SS) or second segment (RI), the number (i) of a currently designated zone, after each extraction of a word from source memory (MS), and then placing into the source memory a transform of a word or of a block that has been subjected to at least one of the first and second transformations.

12. A device according to claim 1, wherein the transfer module (7) is arranged to effect a circular permutation (50) operation of at least one bit, over at least a part of the bits of the third segment (AI) of the working memory after each first transformation, the result of this circular permutation operation constituting the new content of the said third segment (AI).

13. A device according to claim 1, wherein after a chosen number of placements of transforms of words or blocks into the source memory (MS), the processing means (5) is arranged to effect a circular permutation (120, 130), of at least one bit over at last a part of the bits of the first segment (SS), the result of this permutation constituting the new content of the said first segment (SS).

14. A device according to claim 1, wherein the buffer memory (3) comprises a shift register, wherein the data blocks are stacked, according to their order of arrival, beneath one another in the free spaces comprised between a first space (B1) and a last space (512) of the shift register, wherein the transfer means (7) is arranged to extract the block which is situated in the first space (B1), and wherein the said buffer memory (3) is arranged to produce after each extraction of the block stored in the first space (B1), a shift by one position of the set of blocks situated after the first space (B1), so that the block which was situated in the second space (B2) is stored in the first space (B1).

15. A device according to claim 1, wherein the first segment (SS), the second segment (RI), and the third segment (AI) of the working memory (MT) are respectively a first register (SS), a second register (RI), and an increment accumulator (AI).

* * * * *